United States Patent
Sugihara

(10) Patent No.: US 8,928,768 B2
(45) Date of Patent: Jan. 6, 2015

(54) IMAGE PROCESSING DEVICE AND COMPUTER-READABLE COMPUTER PROGRAM PRODUCT CONTAINING IMAGE PROCESSING PROGRAM

(75) Inventor: Mari Sugihara, Tokyo (JP)

(73) Assignee: Nikon Corporation, Tokyo (JP)

( * ) Notice: Subject to any disclaimer, the term of this patent is extended or adjusted under 35 U.S.C. 154(b) by 488 days.

(21) Appl. No.: 13/069,546

(22) Filed: Mar. 23, 2011

(65) Prior Publication Data

US 2011/0234818 A1    Sep. 29, 2011

(30) Foreign Application Priority Data

Mar. 23, 2010  (JP) .................................. 2010-066250

(51) Int. Cl.
| | | |
|---|---|---|
| *H04N 5/228* | (2006.01) | |
| *H04N 9/73* | (2006.01) | |
| *G06K 9/00* | (2006.01) | |
| *G06K 9/46* | (2006.01) | |
| *G06K 9/66* | (2006.01) | |
| *G03B 7/00* | (2014.01) | |
| *H04N 1/21* | (2006.01) | |
| *H04N 5/232* | (2006.01) | |
| *H04N 101/00* | (2006.01) | |

(52) U.S. Cl.
CPC ...... *H04N 1/2112* (2013.01); *H04N 2201/3242* (2013.01); *H04N 5/232* (2013.01); *H04N 2201/0084* (2013.01); *H04N 2101/00* (2013.01); *H04N 5/23222* (2013.01)
USPC ..... 348/222.1; 382/181; 382/190; 348/223.1; 396/222

(58) Field of Classification Search
USPC ....................... 348/222.1–261; 382/155–167, 382/181–231; 396/222
See application file for complete search history.

(56) References Cited

U.S. PATENT DOCUMENTS

| | | | | |
|---|---|---|---|---|
| 4,992,820 | A * | 2/1991 | Kikukawa et al. | 396/222 |
| 8,077,216 | B2 * | 12/2011 | Ishihara | 348/222.1 |
| 8,610,819 | B2 * | 12/2013 | Watanabe | 348/362 |
| 8,611,654 | B2 * | 12/2013 | Yadav | 382/167 |
| 2001/0031084 | A1 | 10/2001 | Cannata et al. | |
| 2004/0021779 | A1 | 2/2004 | Yano | |

(Continued)

FOREIGN PATENT DOCUMENTS

| | | |
|---|---|---|
| EP | 2 085 817 A2 | 8/2009 |
| JP | A 2001-320621 | 11/2001 |

(Continued)

OTHER PUBLICATIONS

Jan. 17, 2012 Office Action issued in Japanese Patent Application No. 2010-066250 (with translation).

(Continued)

*Primary Examiner* — Chia-Wei A Chen
(74) *Attorney, Agent, or Firm* — Oliff PLC

(57) ABSTRACT

An image processing device includes: an evaluation unit that evaluates a plurality of images by designating predetermined image characteristics as an evaluation index; an image processing unit that executes image processing, which will affect the evaluation index, on at least one image among the plurality of images; and an image selection unit that selects an image with superiority in an evaluation value calculated in correspondence to the evaluation index, among the plurality of images evaluated by the evaluation unit by factoring in application of the image processing by the image processing unit.

12 Claims, 8 Drawing Sheets

(56) References Cited

U.S. PATENT DOCUMENTS

| | | |
|---|---|---|
| 2005/0030564 A1 | 2/2005 | Su et al. |
| 2005/0200736 A1* | 9/2005 | Ito .......................... 348/333.01 |
| 2005/0280717 A1 | 12/2005 | Sugimoto |
| 2006/0002616 A1 | 1/2006 | Dolan et al. |
| 2006/0008181 A1* | 1/2006 | Takekoshi ................. 382/305 |
| 2006/0023793 A1* | 2/2006 | Kagechi et al. ......... 375/240.24 |
| 2006/0114520 A1* | 6/2006 | Enomoto et al. ............. 358/448 |
| 2006/0215042 A1* | 9/2006 | Chai et al. ................. 348/222.1 |
| 2006/0227227 A1* | 10/2006 | Tsuruoka ...................... 348/241 |
| 2006/0268126 A1* | 11/2006 | Ishibashi et al. ......... 348/231.99 |
| 2007/0201857 A1* | 8/2007 | Kitamura ...................... 396/222 |
| 2007/0242138 A1* | 10/2007 | Manico et al. ............. 348/231.3 |
| 2008/0050108 A1* | 2/2008 | Mizutani et al. ................ 396/104 |
| 2008/0094420 A1* | 4/2008 | Geigel et al. ..................... 345/660 |
| 2008/0158395 A1* | 7/2008 | Tsuruoka ...................... 348/241 |
| 2009/0040334 A1* | 2/2009 | Ogawa ....................... 348/223.1 |
| 2009/0079852 A1 | 3/2009 | Kojima |
| 2009/0087099 A1 | 4/2009 | Nakamura |
| 2009/0141990 A1* | 6/2009 | Pigeon et al. ................. 382/233 |
| 2009/0141992 A1* | 6/2009 | Coulombe et al. ............ 382/235 |
| 2009/0160995 A1* | 6/2009 | Kohama .................. 348/333.02 |
| 2009/0196522 A1* | 8/2009 | Hikida ........................ 382/255 |
| 2009/0257498 A1* | 10/2009 | Kurata ...................... 375/240.16 |
| 2010/0080288 A1* | 4/2010 | Hamamoto et al. ..... 375/240.03 |
| 2010/0118163 A1* | 5/2010 | Matsugu et al. ......... 348/231.99 |
| 2010/0123805 A1* | 5/2010 | Craig et al. ............... 348/240.99 |
| 2010/0128146 A1* | 5/2010 | Nojima .................... 348/231.99 |
| 2010/0142622 A1* | 6/2010 | Le Leannec et al. .... 375/240.16 |
| 2010/0194918 A1* | 8/2010 | Zhang et al. ................ 348/223.1 |
| 2010/0194963 A1* | 8/2010 | Terashima ............... 348/333.11 |
| 2010/0225780 A1* | 9/2010 | Shimizu .................... 348/223.1 |
| 2010/0246939 A1* | 9/2010 | Aisaka et al. ................. 382/156 |
| 2011/0029553 A1* | 2/2011 | Bogart et al. ................. 707/769 |
| 2011/0169953 A1* | 7/2011 | Sandler et al. ................ 348/144 |
| 2012/0106848 A1* | 5/2012 | Greig et al. .................. 382/195 |
| 2013/0027583 A1* | 1/2013 | Ito ............................ 348/231.99 |
| 2013/0215314 A1* | 8/2013 | Prentice et al. ........... 348/333.11 |
| 2013/0342725 A1* | 12/2013 | Zhang ....................... 348/223.1 |

FOREIGN PATENT DOCUMENTS

| | | |
|---|---|---|
| JP | A-2001-320621 | 11/2001 |
| JP | A-2004-62651 | 2/2004 |
| JP | A-2009-77241 | 4/2009 |
| JP | A-2009-118434 | 5/2009 |
| JP | A-2009-188490 | 8/2009 |

OTHER PUBLICATIONS

Extended European Search Report issued in European Patent Application No. 11159361.2 dated Sep. 23, 2011.

* cited by examiner

FIG.5

| IMAGE NUMBER | | EVALUATION VALUE 1 (IMAGE COMPOSITION) | EVALUATION VALUE 2 (FACE) | EVALUATION VALUE 3 (IMAGE BLUR) | EVALUATION VALUE 4 (IMAGE QUALITY) | TOTAL EVALUATION VALUE | RANKING |
|---|---|---|---|---|---|---|---|
| 1 | INITIAL VALUE | 9 | 9 | 1 | 4 | 5.5 | 2 |
|   | UPDATE VALUE | 9 | 9 | 7 | 6 | 7.8 | 1 |
| 2 | INITIAL VALUE | 5 | 5 | 5 | 4 | 4.8 | 3 |
|   | UPDATE VALUE | 6 | 6 | 6 | 6 | 6 | 3 |
| 3 | INITIAL VALUE | 8 | 8 | 7 | 4 | 6.8 | 1 |
|   | UPDATE VALUE | 8 | 8 | 8 | 6 | 7.5 | 2 |
| 4 | INITIAL VALUE | 1 | 2 | 3 | 5 | 2.8 | 4 |
|   | UPDATE VALUE | 3 | 4 | 6 | 7 | 5 | 4 |

| INDEX | TYPES OF CORRECTION PROCESSING EXECUTED TO IMPROVE INDEX EVALUATION VALUE |
|---|---|
| IMAGE COMPOSITION | • TILT CORRECTION<br>• STRAIGHTENING<br>• DISTORTION CORRECTION<br>• TRIMMING |
| HUMAN SUBJECT'S FACE | •FACIAL EXPRESSION CORRECTION<br>•RED-EYE REDUCTION<br>•TONE CORRECTION<br>•COLOR CORRECTION |
| IMAGE BLUR | •FOCUSING CONDITION CORRECTION<br>•REDUCTION OF EFFECT OF SHAKY CAMERA HANDLING |
| IMAGE QUALITY | •FOREIGN MATTER REMOVAL CORRECTION<br>•TONE CORRECTION<br>•COLOR CORRECTION<br>•WHITE BALANCE CORRECTION<br>•NOISE REDUCTION<br>•EXPOSURE CORRECTION |

IMAGE PROCESSING DEVICE AND COMPUTER-READABLE COMPUTER PROGRAM PRODUCT CONTAINING IMAGE PROCESSING PROGRAM

INCORPORATION BY REFERENCE

The disclosure of the following priority application is herein Incorporated by reference: Japanese Patent Application No. 2010-66250 filed Mar. 23, 2010

BACKGROUND OF THE INVENTION

1. Field of the Invention

The present invention relates to an image processing device and a computer-readable computer program product containing an image processing program.

2. Description of Related Art

Image processing devices known in the related art include the image processor disclosed in Japanese Laid Open Patent Publication No. 2001-320621. This image processor selects an image according to predetermined criteria and executes processing such as printing or data transfer for the selected image.

SUMMARY OF THE INVENTION

However, an image that fails to satisfy a criterion corresponding to one evaluation index will not be selected by the image processor in the related art even if the image is evaluated highly with respect to other indices. This means that the image that is ultimately selected is not necessarily the best image.

According to the 1st aspect of the present invention, an image processing device comprises: an evaluation unit that evaluates a plurality of images by designating predetermined image characteristics as an evaluation index; an image processing unit that executes image processing, which will affect the evaluation index, on at least one image among the plurality of images; and an image selection unit that selects an image with superiority in an evaluation value calculated in correspondence to the evaluation index, among the plurality of images evaluated by the evaluation unit by factoring in application of the image processing by the image processing unit.

According to the 2nd aspect of the present invention, in the image processing device according to the 1st aspect, it is preferred that the image processing unit executes the image processing on a specific image selected based upon the evaluation value among the plurality of images; and the image selection unit selects an image with the superiority in the evaluation value among images including the specific image having undergone the image processing, designated as selection candidates.

According to the 3rd aspect of the present invention, in the image processing device according to the 1st aspect, it is preferred that the image processing unit executes the image processing through which the evaluation value calculated in correspondence to the evaluation index will be improved, for the at least one image.

According to the 4th aspect of the present invention, in the image processing device according to the 1st aspect, it is preferred that the image processing unit determines, in correspondence to each of the plurality of images, a type of the image processing through which the evaluation value will improve, and executes only the type of the image processing through which the evaluation value will improve.

According to the 5th aspect of the present invention, in the image processing device according to the 1st aspect, it is preferred that correlation data indicating a change in the evaluation value from a pre-image processing value to a post-image processing value, which will result from the image processing executed by the image processing unit, are set in advance; and the image processing unit determines the type of the image processing through which the evaluation value will improve based upon the correlation data having been set.

According to the 6th aspect of the present invention, in the image processing device according to the 1st aspect, it is preferred that the image selection unit predicts image processing results of the image processing to be executed by the image processing unit and selects the image with the superiority in the evaluation value calculated in correspondence to the evaluation index, among the plurality of images, based upon the image processing results predicted.

According to the 7th aspect of the present invention, in the image processing device according to the 6th aspect, it is preferred that correlation data indicating a change in the evaluation value from a pre-image processing value to a post-image processing value, which will result from the image processing executed by the image processing unit, are set in advance; and the image selection unit predicts the image processing results of the image processing to be executed by the image processing unit based upon the correlation data having been set.

According to the 8th aspect of the present invention, in the image processing device according to the 7th aspect, it is preferred that the image processing device further comprises: a recording control unit that records image processing information related to a type of the image processing executed by the image processing unit, through which the evaluation value can be improved, in correspondence to each image, the evaluation value of which is expected to improve through the image processing. The image processing unit determines the type of the image processing based upon the correlation data.

According to the 9th aspect of the present invention, in the image processing device according to the 8th aspect, it is preferred that the image processing unit executes the type of the image processing identified based upon the image processing information for each image in correspondence to which the image processing information is recorded.

According to the 10th aspect of the present invention, in the image processing device according to the 1st aspect, it is preferred that the evaluation index includes at least one of an image composition, an image blur condition, an image quality and a condition of a face of a human subject, pertaining to each of the plurality of images.

According to the 11th aspect of the present invention, in the image processing device according to the 1st aspect, it is preferred that the evaluation unit executes integrated evaluation of a plurality of types of evaluation indices corresponding to a plurality of image characteristics, each of which is different from one another.

According to the 12th aspect of the present invention, in the image processing device according to the 1st aspect, it is preferred that the image processing includes at least one of; image processing executed for the at least one image to correct an image composition, image processing executed for the at least one image to reduce an effect of shaky camera handling, image processing executed for the at least one image to correct a focusing condition, tone correction processing executed for the at least one image, color correction processing executed for the at least one image, foreign matter removal processing executed for the at least one image, facial expression correction processing executed to correct a facial expression of a human subject in the at least one image and red-eye reduction processing executed for the at least one image.

According to the 13th aspect of the present invention, a computer-readable computer program product containing an image processing program, with the image processing program comprises: an evaluation instruction for a computer to evaluate a plurality of images by designating predetermined image characteristics as an evaluation index; an image processing instruction for the computer to execute image processing, which will affect the evaluation index, on at least one image among the plurality of images; and an image selection instruction for the computer to select an image with superiority in an evaluation value calculated in correspondence to the evaluation index, among the plurality of images evaluated in response to the evaluation instruction, by factoring in application of the image processing executed in response to the image processing instruction.

BRIEF DESCRIPTION OF THE DRAWINGS

FIG. 5 indicates how evaluation values may change through correction.

FIG. 6 presents lists of specific types of correction processing through which the individual index evaluation values can be improved.

DESCRIPTION OF PREFERRED EMBODIMENTS

Figure 1:
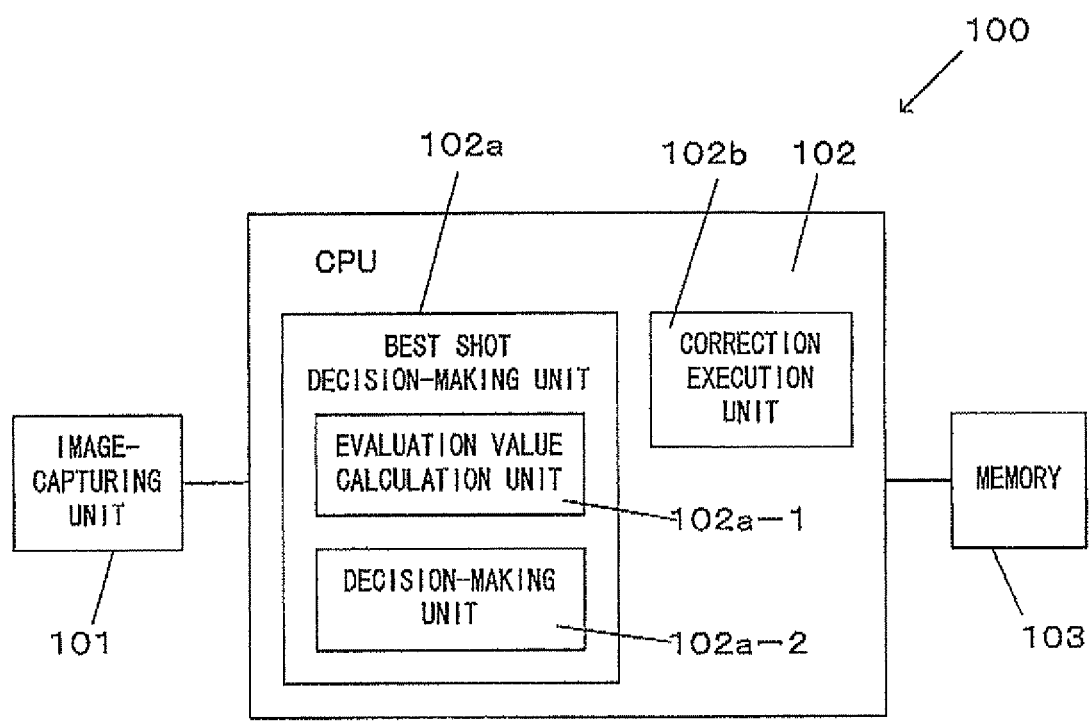
FIG. 1 is a block diagram showing the structure of the camera achieved in an embodiment of the present invention.

FIG. 1 is a block diagram showing the structure of a camera 100 achieved in an embodiment of the present invention. The camera 100 includes an image-capturing unit 101, a CPU 102 and a memory 103. The image-capturing unit 101, which includes an image sensor such as a CCD image sensor or a CMOS image sensor, obtains image data by capturing a subject image. The CPU 102 executes overall control of the camera 100. Specific functions of the CPU 102 are fulfilled by a best shot decision-making unit 102a and a correction execution unit 102b, included in the CPU 102 as functional units thereof. The best shot decision-making unit 102a, in turn, includes functional units referred to as an evaluation value calculation unit 102a-1 and a decision-making unit 102a-2. Details of the processing executed by these units are to be provided later.

The memory 103 is constituted with an SDRAM and a flash memory. The SDRAM, which is a volatile memory, is used as a work memory where a program is opened when the CPU 102 is engaged in program execution and as a buffer memory where data are temporarily recorded. In the flash memory, which is a nonvolatile memory, data related to the program executed by the CPU 102, various parameters that are read at the time of program execution and the like are recorded. The memory 103 further includes a memory card loaded in a memory card slot (not shown). Image files generated based upon image data obtained via the image-capturing unit 101 and the like are recorded in the memory card.

The camera 100 achieved in the embodiment has a function of selecting the most desirable best shot image among images recorded in the memory 103. When, for instance, the user selects a plurality of images recorded in the memory 103 and an instruction for the CPU 102 to select a best shot image among the plurality of selected images is issued, the CPU 102 executes best shot image selection processing, to be described in detail later, in order to select the best shot image.

A best shot image among a plurality of images is normally selected by calculating an evaluation value corresponding to each predetermined evaluation index for each of the plurality of images and selecting the image with the highest evaluation value total as the best shot image. However, there is an issue yet to be addressed with respect to this best shot image selection method in that an image awarded a low evaluation value in correspondence to one index among the plurality of indices, which is otherwise awarded with very high evaluation values, may not always be selected as the best shot image. For instance, an image awarded through calculation with high evaluation values in correspondence to indices such as the image composition, the subject's facial expression and the like may have a low "red-eye" index evaluation value and, for this reason, may not be selected as the best shot image. Under such circumstances, however, the red-eye index evaluation value of the image can be improved through red-eye correction processing so as to raise the likelihood of the image being selected as the best shot image.

Figure 2A:
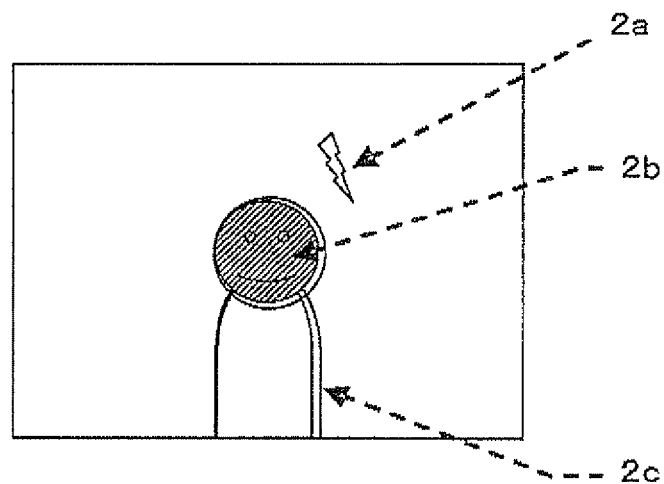
FIGS. 2A and 2B present an example of an image the evaluation values of which can be improved through correction.
Figure 2B:
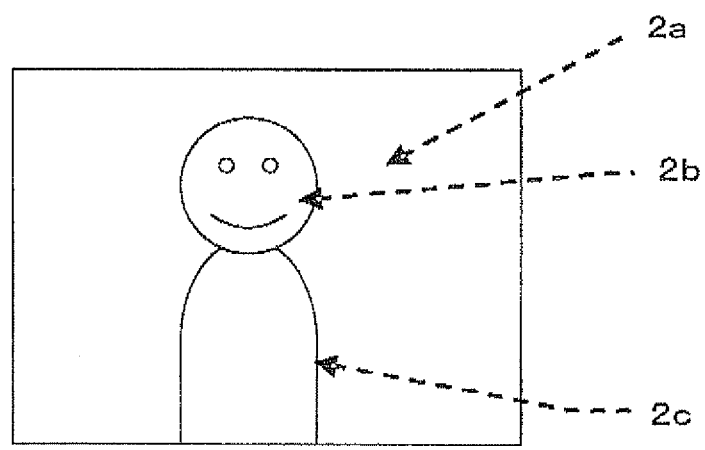

For instance, the image shown in FIG. 2A, which includes foreign matter 2a captured in the image, and a subject's face 2b in shadow, assuming a poor composition with the subject's face 2b at the center of the image and manifesting an image blur 2c due to camera movement, will not be selected as the best shot image since the evaluation values calculated in correspondence to these indices are bound to be low. However, the image may be corrected so as to erase the foreign matter 2a, brighten the subject's face 2b, modify the composition by shifting the subject slightly upward and reduce the extent of image blur 2c, as shown in FIG. 2B, so as to improve the evaluation values corresponding to the individual indices. The image thus corrected will have a better chance of being selected as the best shot image.

The CPU 102 in the embodiment first executes image processing for the plurality of images designated as best shot image selection candidates so as to improve various index evaluation values to be awarded to the individual images and then selects a best shot image based upon the index evaluation values calculated for each of the plurality of images. Since the best shot image is selected by factoring in the application of image processing, the quality of the ultimately selected best shot image can be improved.

In the embodiment, the characteristics of each image are evaluated in best shot image decision-making by checking evaluation indices such as "image composition", "face", "image blur" and "image quality". The evaluation value calculation unit 102a-1 calculates an evaluation value for the "image composition" index for purposes of image composition evaluation by, for instance, analyzing the image composition. In addition, the evaluation value calculation unit 102a-1 calculates an evaluation value for the "face" index for purposes of human subject's face condition evaluation by analyzing the facial expression, the red-eye condition, the tone and the color of the subject's face. The evaluation value calculation unit 102a-1 further calculates an evaluation value for the "image blur" index for purposes of image blur condition evaluation by analyzing the focusing condition or the shaky camera handling condition. The evaluation value calculation unit 102a-1 also calculates an evaluation value for the "image quality" index for purposes of image quality evaluation by analyzing any foreign matter that may be present in the image, the tone, the color, the white balance, the noise reduction and the exposure. The decision-making unit 102a-2 then selects an image judged to be superior with high evaluation values calculated in correspondence to the various evaluation indices as the best shot image.

Figure 3:
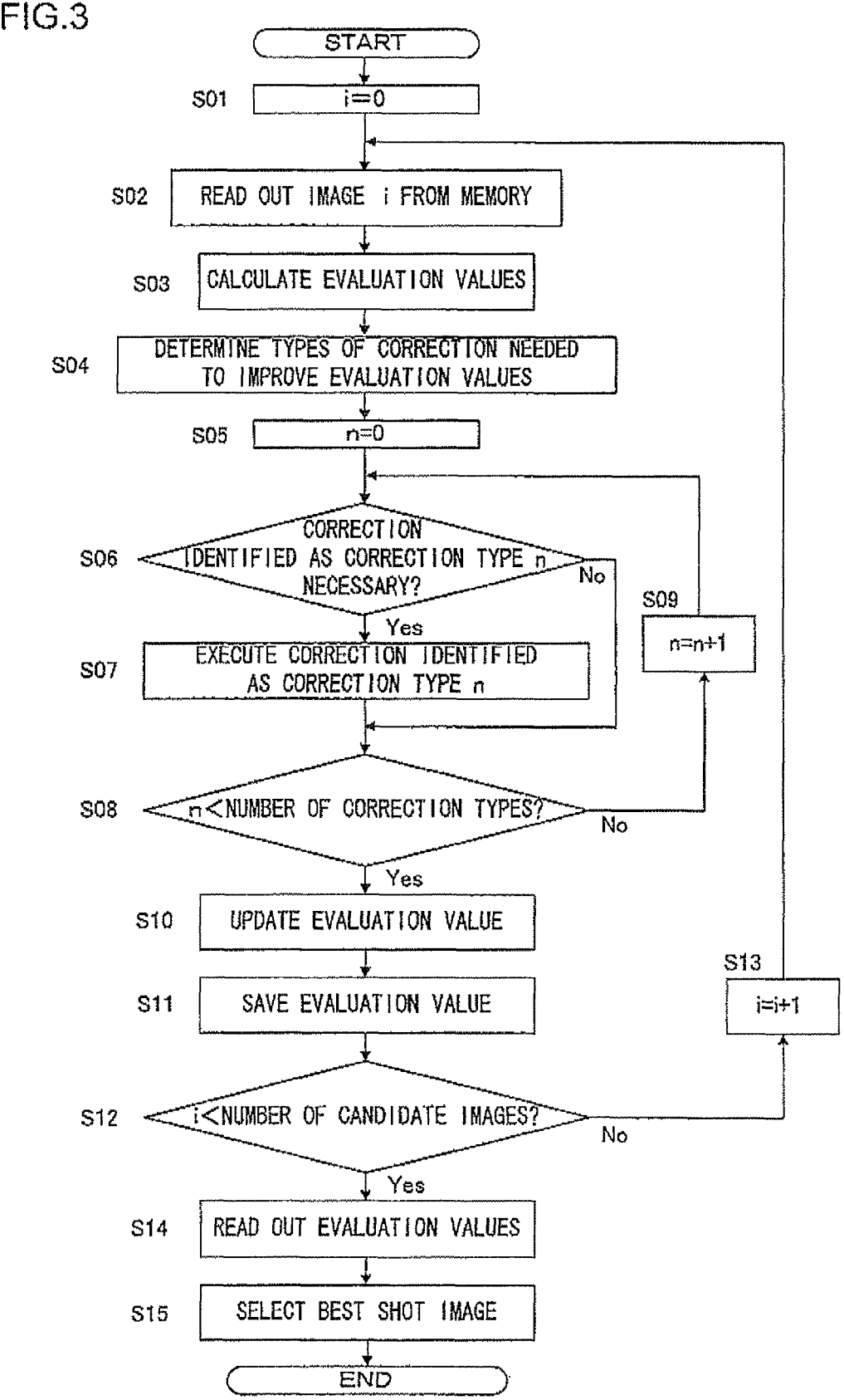
FIG. 3 presents a flowchart of the best shot image selection processing.

FIG. 3 presents a flowchart of the best shot image selection processing executed in the embodiment. The processing in FIG. 3 is executed by the CPU 102 based upon a program started up as a plurality of images are specified by the user and an instruction for best shot image selection is issued as described earlier.

In step S01, the best shot decision-making unit 102a initializes a counter i, which counts the number of images designated as best shot image selection candidates by resetting the counter value to 0 and then the operation proceeds to step S02. In step S02, the best shot decision-making unit 102a reads out an image i, among the plurality of images selected by the user, from the memory 103. The operation then proceeds to step 503.

In step S03, the evaluation value calculation unit 102a-1 calculates evaluation values, each corresponding to a specific evaluation index among the various evaluation indices used in the best shot decision-making, for the image i, as explained earlier. In the description of the embodiment, the evaluation values calculated in step S03 are referred to as "initial evaluation values" and the evaluation values recalculated in step S10, as described later, are referred to as "update evaluation values", so as to clearly distinguish them from each other.

Figure 4:
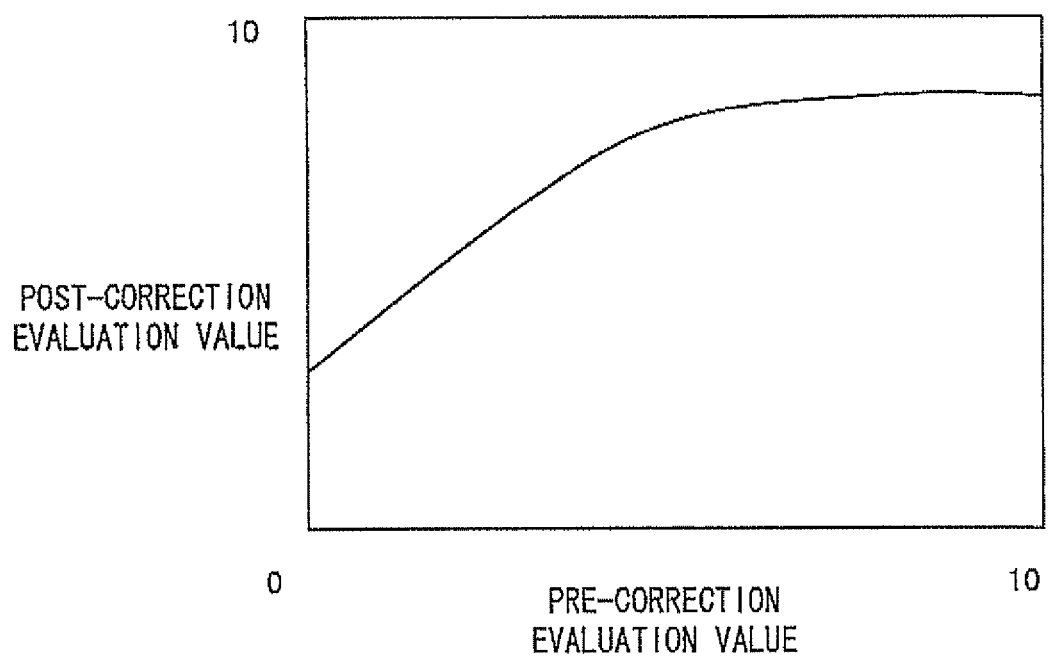
FIG. 4 indicates a correlation that may exist between a pre-correction evaluation value and the corresponding post-correction evaluation value.

Subsequently, the operation proceeds to step S04, in which the decision-making unit 102a-2 makes a decision as to specific types of correction (image processing) through which initial evaluation values having been calculated in step S03 can be improved. More specifically, correlation data indicating the correlation between the pre-correction evaluation value and the post correction evaluation value, such as that shown in FIG. 4, are set in advance in the CPU 102 in correspondence to each type of correction related to a specific index among the indices mentioned above, and the decision-making unit 102a-2 references the correlation data indicating such correlation when determining a specific types of correction processing that the image should undergo to improve its initial evaluation values.

FIG. 6 presents examples of specific types of correction through which the individual index evaluation values may be improved. The types of correction through which the evaluation value calculated for the "image composition" index can be improved include, for instance, tilt correction, straightening, distortion correction and trimming (cropping through electronic zoom). The types of correction through which the evaluation value calculated for the "face" index can be improved include, for instance, expression correction, red-eye reduction, tone correction and color correction. The types of correction through which the evaluation value calculated for the "image blur" index can be improved include, for instance, focus correction executed to correct the focusing condition and shaky camera handling correction executed to reduce the extent of image blur attributable to shaky camera handling. The types of correction for which the evaluation value calculated for the "image quality" index can be improved include, for instance, blemish correction (foreign matter removal), tone correction, color correction, white balance correction, noise reduction and exposure correction.

Subsequently, the operation proceeds to step S05 in which the best shot decision-making unit 102a initializes a variable n used to identify a type of correction to be executed on the image by resetting it to 0, before the operation proceeds to step S06. In step S06, the decision-making unit 102a-2 makes a decision as to whether or not the correction processing identified as the correction type n needs to be executed in order to improve an evaluation value based upon the results of the decision made in step S04. If a negative decision is made in step S06, the operation proceeds to step S08 to be described in detail later. If, on the other hand, an affirmative decision is made in step S06, the operation proceeds to step S07.

In step S07, the correction execution unit 102b executes the specific type of correction processing, the execution of which has been determined to be necessary in step S06, for the image i, and then the operation proceeds to step S08. In step S08, the best shot decision-making unit 102a makes a decision as to whether or not the value assumed for the variable n is smaller than the number of types of correction corresponding to the various indices described above. If a negative decision is made in step S08, the operation proceeds to step S09, in which the best shot decision-making unit 102a increments the variable n by 1, before the operation returns to step S06. If an affirmative decision is made in step S08, the operation proceeds to step S10.

In step S10, the evaluation value calculation unit 102a-1 calculates the update evaluation values each in correspondence to one of the evaluation indices for the image having undergone the correction processing, and replaces the initial evaluation values with the update evaluation values thus calculated. As a result, the initial evaluation values corresponding to the individual indices are updated with the update evaluation values. In the example presented in FIG. 5, the average of the evaluation values corresponding to the "image composition" index, the "face" index, the "image blur" index and the "image quality" index is calculated as an integrated evaluation value for each image. The pre-correction integrated evaluation value is equivalent to an initial evaluation value, whereas the post correction integrated evaluation value is equivalent to an update evaluation value.

In the example presented in FIG. 5, an initial evaluation value 5a calculated for the image assigned with image No. 1 is updated with an update evaluation value 5b. In this example, the image assigned with image No. 1 is awarded a better update evaluation value 5b relative to the initial evaluation value 5a, due to improvements achieved through the correction in the evaluation value for the "image blur" index and the evaluation value for the "image quality" index. An initial evaluation value 5c calculated for the image assigned with image No. 2 is updated with an update evaluation value 5d. The image assigned with image No. 2 is awarded a better update evaluation value 5d relative to the initial evaluation value 5c, due to improvements achieved through the correction in the evaluation values corresponding to all the evaluation indices, i.e., the "image composition" index, the "face" index, the "image blur" index and the "image quality" index.

An initial evaluation value 5e calculated for the image assigned with image No. 3 is updated with an update evaluation value 5f. In this example, the image assigned with image No. 3 is awarded a better update evaluation value 5f relative to the initial evaluation value 5e, due to improvements achieved through the correction in the evaluation value for the "image blur" index and the evaluation value for the "image quality"

index. An initial evaluation value 5c calculated for the image assigned with image No. 4 is updated with an update evaluation value 5h. The image assigned with image No. 4 is awarded a better update evaluation value 5h relative to the initial evaluation value 5g, due to improvements achieved through the correction in all evaluation values corresponding to all the evaluation indices, i.e., the "image composition" index, the "face" index, the "image blur" index and the "image quality" index.

Subsequently, the operation proceeds to step S11 in which the evaluation value calculation unit 102a-1 records the update evaluation values into the memory 103 and then the operation proceeds to step S12. In step S12, the best shot decision-making unit 102a makes a decision as to whether or not the count value at the counter i is smaller than the number of images designated as the best shot image selection candidates. If a negative decision is made in step S12, the operation proceeds to step S13, in which the best shot decision-making unit 102a increments the count value at the counter i by 1, and then the operation returns to step S02. If, on the other hand, an affirmative decision is made in step S12, the operation proceeds to step S14.

In step S14, the decision-making unit 102a-2 reads out from the memory 103 the update evaluation values corresponding to the individual images recorded into the memory 103 in step S11, and then the operation proceeds to step S15. In step S15, the decision-making unit 102a-2 selects, as the best shot image, the image with the highest update evaluation value among the update valuation values corresponding to the various images read out from the memory 103 in step S14 and then the processing ends.

In the example presented in FIG. 5, the update evaluation value 5b is the highest among the update evaluation values 5b, 5d, 5f and 5h calculated for the images assigned with image numbers 1 through 4 and thus, the image assigned with image No. 1 will be selected as the best shot image. However, if a best shot image were selected without executing correction such as that executed in the embodiment, the image assigned with image No. 3 would be selected as the best shot image, since the initial evaluation value 5e calculated for the image assigned with image No. 3, is the highest among the initial evaluation values 5a, 5c, 5e and 5g of the images assigned with image numbers 1 through 4. In other words, image processing through which the various index evaluation values used for purposes of best shot image selection can be improved, is first executed for each of the images designated as the best shot image selection candidates and then the best shot image is selected based upon recalculated evaluation values, i.e., the update evaluation values, in the embodiment described above. Consequently, a better image can be selected as the best shot image.

The following advantages are achieved through the embodiment described above.

(1) The decision-making unit 102a-2 selects the image judged to be superior based upon its index evaluation values among the plurality of images designated as the best shot image selection candidates, by factoring in application of specific types of image processing executed to favorably affect the initial index evaluation values. As a result, a better image can be selected as the best shot image.

(2) The decision-making unit 102a-2 identifies the types of correction through which the individual index evaluation values can be improved and the correction execution unit 102b executes the types of correction processing identified as processing that will improve the evaluation values, on each image. Since a given type of correction processing is not executed unless it is judged to improve an evaluation value, execution of meaningless processing is prevented.

(3) The decision-making unit 102a-2 determines a specific type of correction processing that the candidate image should undergo to achieve a higher evaluation value than the initial evaluation value based upon correlation data indicating the correlation between the pre-correction evaluation value and the post-correction evaluation value, such as those shown in FIG. 4. Thus, the type of correction through which the evaluation value can be improved can be determined through simple processing.

—Variations—

The camera achieved in the embodiment described above allows for the following variations.

(1) The CPU 102 in the embodiment described above selects the best shot image among a plurality of images selected from images already recorded in the memory 103. The CPU 102 may also execute the best shot image selection processing in FIG. 3 when a plurality of images, obtained through a continuous shooting operation, are recorded into the memory 103, so as to select a best shot image among the plurality of images captured through the continuous shooting operation. In other words, the best shot image selection processing may be adopted in conjunction with continuous shooting operation so as to enable selection of the optimal best shot image among the plurality of images obtained through the continuous shooting operation.

(2) In the embodiment described above, an evaluation value calculation unit 102a-1 calculates update evaluation values for images having undergone the correction executed by the correction execution unit 102b and the decision-making unit 102a-2 selects the best shot image based upon the update evaluation values. As an alternative, the evaluation value calculation unit 102a-1 may predict update evaluation values based upon correlation data such as those shown in FIG. 4, indicating the correlation between pre-correction evaluation values and the respective post-correction evaluation values and the decision-making unit 102a-2 may select the best shot image based upon the predicted update evaluation values. In this case, the best shot image can be selected by factoring in the effects to be achieved through image processing without actually executing the image processing, and thus, the processing load can be reduced.

When this alternative is adopted, the evaluation value calculation unit 102a-1 may record into the memory 103 specific types of corrective image processing through which the individual evaluation values can be improved in correspondence to each image. Then, in response to an image processing execution instruction issued by the user, the correction execution unit 102b may identify the types of corrective image processing through which the evaluation values of the candidate image can be improved, based upon the correction types recorded in correspondence to the particular image and execute the types of image processing thus identified on the image. Through these measures, the image processing through which an improved best shot image is obtained can be executed with any timing desired by the user.

Figure 7:
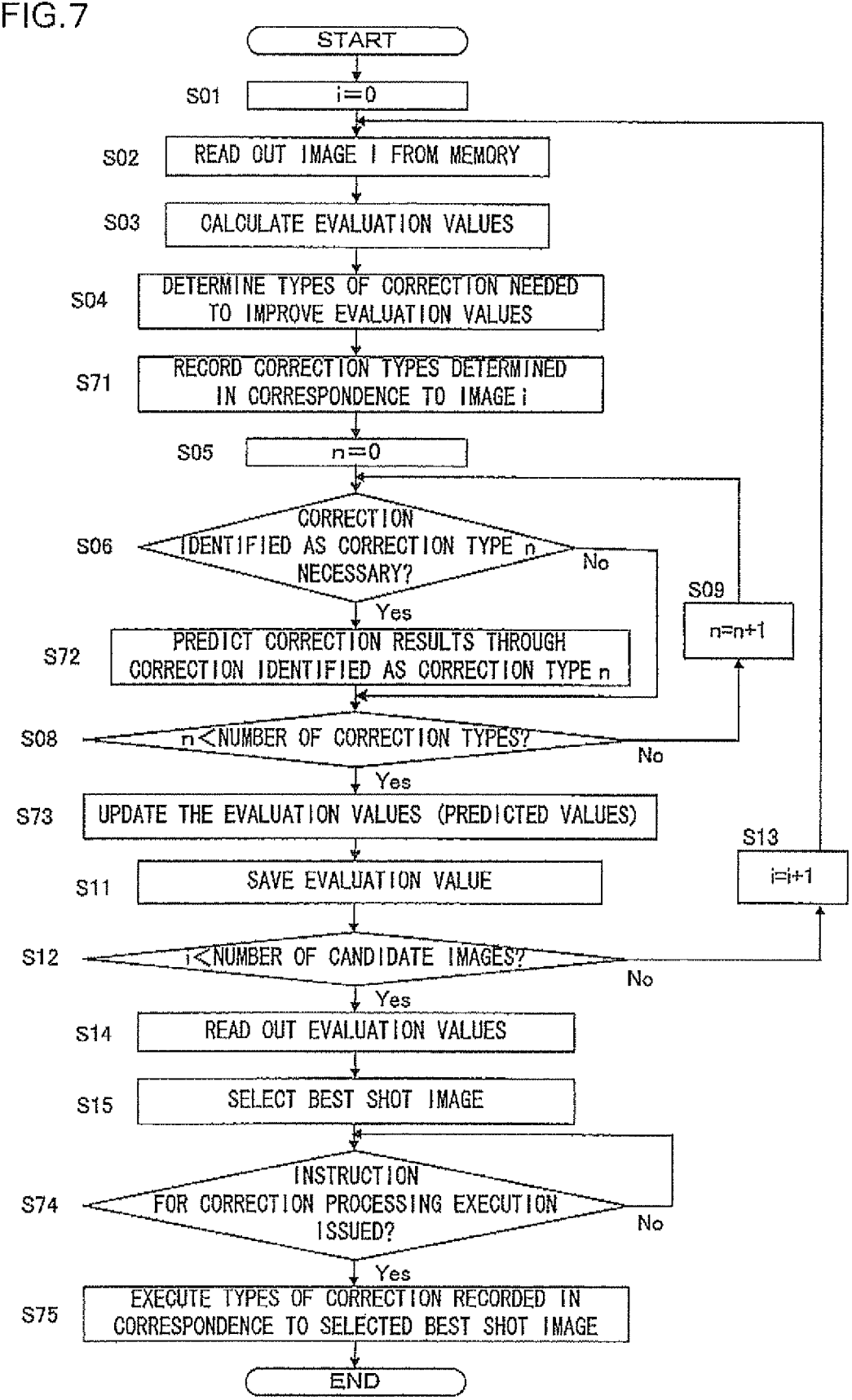
FIG. 7 presents a flowchart of the best shot image selection processing executed in the camera 100 in a variation of the embodiment of the present invention.
Figure 8:
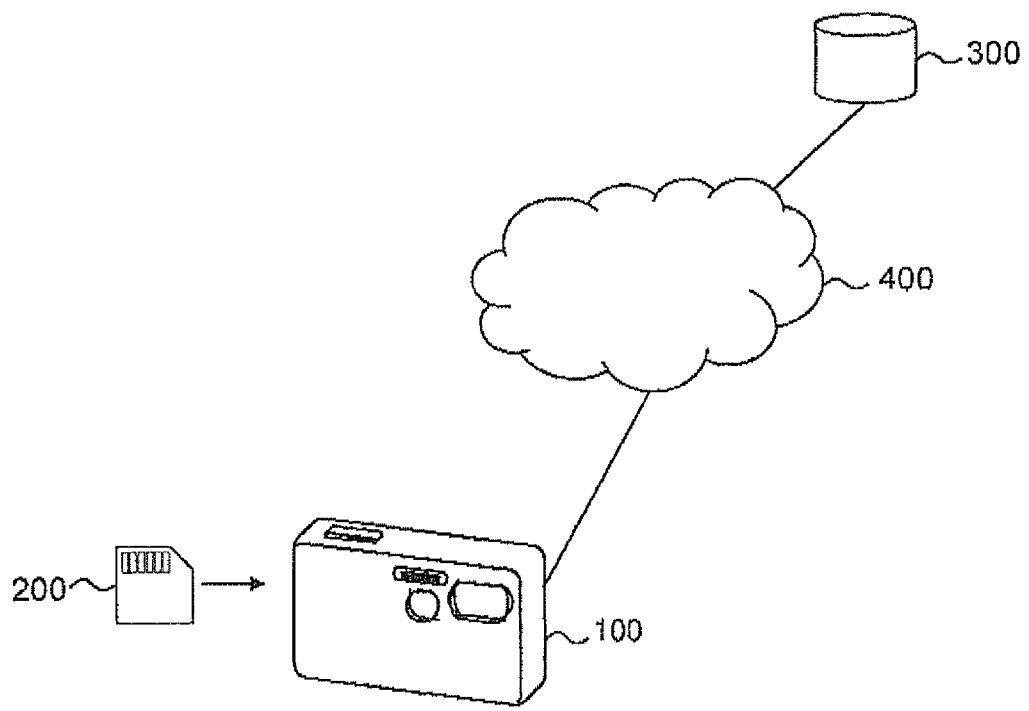
FIG. 8 illustrates how a computer-readable computer program product containing an image processing program that enables the camera achieved in an embodiment of the present invention to execute image processing may be provided.

FIG. 7 presents a flowchart of the best shot image selection processing executed in the camera 100 in variation (2). The following description given in reference to FIG. 7 does not include an explanation of the processing executed in the processing steps assigned with the same step numbers as those in FIG. 3. In step S71, which follows step S04, the evaluation value calculation unit 102a-1 records the specific types of image processing (correction types) having been determined in step S04 into the memory 103 in relation to the particular image. Upon completing the processing in step S71, the operation proceeds to step S05.

In step S72, which follows step S06, the decision-making unit 102a-2 predicts image processing results that would be achieved via the correction execution unit 102b by executing each of the specific types of image processing having been determined. Upon completing the processing in step S72, the operation proceeds to step S08. In step S73, which follows step S08, the evaluation value calculation unit 102a-1 updates the initial evaluation values with predicted evaluation values, each predicted in correspondence to a specific evaluation index, which correspond to the image processing results having been predicted in step S72. Upon completing the processing in step S73, the operation proceeds to step S11.

In step S74, which follows step S15, the correction execution unit 102b makes a decision as to whether or not the user has issued an instruction for image processing execution in order to obtain the best shot image. In step S75, which follows S74, the correction execution unit 102b executes the specific types of image processing having been recorded in relation to the particular image in step S71 for the best shot image having been selected in step S15, and then the processing ends.

(3) In the embodiment described above, the evaluation value calculation unit 102a-1 calculates update evaluation values for images having undergone the correction executed by the correction execution unit 102b and the decision-making unit 102a-2 selects the best shot image based upon the update evaluation values. As an alternative, the evaluation value calculation unit 102a-1 may predict update evaluation values based upon correlation data such as those shown in FIG. 4, indicating the correlation between pre-correction evaluation value and the respective post-correction evaluation values, the correction execution unit 102b may recalculate update evaluation values only for some of the images among the plurality of images, i.e., for the images for which the highest update evaluation values have been predicted, and the decision-making unit 102a-2 may select a best shot image based upon the recalculated update evaluation values.

In the embodiment described above, the decision-making unit 102a-2 determines the types of correction needed to be executed in order to improve evaluation values in step S04 in FIG. 3 and then makes a decision in step S06 based upon correction types having been determined as to whether or not it is necessary to execute the correction identified as correction type n in order to improve an evaluation value. The correction execution unit 102b then executes the particular type of correction processing, the execution of which is determined to be necessary in step S06, on the image. As an alternative, the correction execution unit 102b may execute all types of correction processing on all the images, without engaging the decision-making unit 102a-2 in the decision making in step S04 or step S06.

(5) In the embodiment described above, the decision-making unit 102a-2 selects a single image with the highest update evaluation value as the best shot image. However, the present invention is not limited to this example and the decision-making unit 102a-2 may select a predetermined number of images, e.g., three images, with the highest update evaluation values, as best shot images.

(6) While "image composition", "face", "image blur" and "image quality" are used in the embodiment described above as evaluation indices when selecting the best shot image, an essential requirement of the present invention is that at least one of these indices be used for best shot image selection.

(7) In the embodiment described above, the correction execution unit 102b executes tilt correction, straightening and distortion correction in order to improve the evaluation value calculated for the "image composition" index, executes facial expression correction, red-eye correction, tone correction and color correction in order to improve the evaluation value calculated for the "face" index, executes focus correction and shaky camera handling correction in order to improve the evaluation value calculated for the "image blur" index, and executes blemish correction (foreign matter removal), tone correction, color correction, white balance correction, noise reduction and exposure correction in order to improve the evaluation value calculated for the "image quality" index. As an alternative, the correction execution unit 102b may execute at least one type of correction processing among the various types of correction processing.

(8) A computer program product enabling the built-in computer in the camera 100 to execute the image processing in the embodiment and the variations described above may be provided in a recording medium 200 (e.g., a memory card) or via a data signal originating from a server 300 and transmitted through a communication network 400 (e.g., the Internet). The built-in computer in the camera 100 receives the image processing program via the recording medium 200. The image processing program may be otherwise provided in the following distribution mode. The built-in computer in the camera 100 has a function that allows it to be connected with the communication network 400. The sewer 300 is a computer that provides the image processing program stored in a storage device such as a hard disk. The server 300 transfers the image processing program read out from the hard disk as a data signal on a carrier wave to deliver the image processing program to the built-in computer in the camera 100 via the communication network 400. In other words, it is desirable to provide the image processing program in the recording medium 200 or in the form of a computer program product assuming any of various modes including a data signal transmitted via the communication network 400.

The embodiment described above and variations thereof are simply provided as examples and components other than those in the embodiments may be used as long as the features characterizing the present invention are not compromised. In addition, the embodiment may be adopted in combination with a plurality of variations.

The above described embodiments are examples and various modifications can be made without departing from the scope of the invention.

What is claimed is:
1. An image processing device, comprising:
an evaluation unit that evaluates a plurality of images based on predetermined image characteristics corresponding to an evaluation index;
a decision-making unit that determines a specific type of image processing, which will improve an evaluation value of at least one of the plurality of images, the evaluation value calculated in correspondence to the evaluation index;
an image processing unit that executes the specific type of image processing which is determined by the decision-making unit; and
an image selection unit that selects an image from the plurality of images having a post-image processing evaluation value with superiority, the post-image processing evaluation value being calculated by factoring in the execution of the specific type of image processing by the image processing unit.
2. The image processing device according to claim 1, wherein:

the image processing unit executes the specific type of image processing on a specific image, among the plurality of images, selected based upon the evaluation value; and the image selection unit selects the specific image as the image with the superiority in the post-image processing evaluation value among images including the specific image having undergone the specific type of image processing, the images including the specific image having been designated as selection candidates.

3. The image processing device according to claim 1, wherein:

the decision-making unit determines, in correspondence to each of the plurality of images, a specific type of the image processing through which the evaluation value will improve, and executes only the specific type of the image processing through which the evaluation value will improve.

4. The image processing device according to claim 1, wherein:

correlation data indicating a change in the evaluation value from a pre-image processing evaluation value to the post-image processing evaluation value, which will result from the specific type of image processing executed by the image processing unit, are set in advance; and the decision-making unit determines the specific type of the image processing through which the evaluation value will improve based upon the correlation data having been set.

5. The image processing device according to claim 1, wherein:

the image selection unit predicts image processing results of the specific type of image processing to be executed by the image processing unit and selects the image with the superiority in the post-image processing evaluation value calculated in correspondence to the evaluation index, among the plurality of images, based upon the image processing results predicted.

6. The image processing device according to claim 5, wherein:

correlation data indicating a change in the evaluation value from a pre-image processing evaluation value to the post-image processing evaluation value, which will result from the specific type of image processing executed by the image processing unit, are set in advance; and the image selection unit predicts the image processing results of the specific type of image processing to be executed by the image processing unit based upon the correlation data having been set.

7. The image processing device according to claim 6, further comprising:

a recording control unit that records image processing information related to a type of the image processing, through which the evaluation value can be improved, executed by the image processing unit, in relation to each image of which the valuation value is expected to improve through the image processing, wherein:

the decision-making unit determines the specific type of the image processing based upon the correlation data.

8. The image processing device according to claim 7, wherein:

the image processing unit executes the specific type of the image processing identified based upon the image processing information for each image in correspondence to which the image processing information is recorded.

9. The image processing device according to claim 1, wherein:

the evaluation index includes at least one of: an image composition, an image quality and a condition of a face of a human subject, pertaining to each of the plurality of images.

10. The image processing device according to claim 1, wherein:

the evaluation unit executes integrated evaluation of a plurality of types of evaluation indices corresponding to a plurality of image characteristics, each of which is different from one another.

11. The image processing device according to claim 1, wherein:

the specific type of image processing includes at least one of; image processing executed for the at least one image to correct an image composition, image processing executed for the at least one image to reduce an effect of shaky camera handling, image processing executed for the at least one image to correct a focusing condition, tone correction processing executed for the at least one image, color correction processing executed for the at least one image, foreign matter removal processing executed for the at least one image, facial expression correction processing executed to correct a facial expression of a human subject in the at least one image and red-eye reduction processing executed for the at least one image.

12. A non-transitory computer-readable medium containing an image processing program, the image processing program comprising:

an evaluation instruction for a computer to evaluate a plurality of images based on predetermined image characteristics corresponding to an evaluation index;

a decision-making instruction for the computer to determine a specific type of image processing: which will improve an evaluation value of at least one of the plurality of images, the evaluation value calculated in correspondence to the evaluation index;

an image processing instruction for the computer to execute the specific type of image processing which is determined by the decision-making instruction; and an image selection instruction for the computer to select an image, from the plurality of images having a post-image processing evaluation value with superiority, the post-image processing evaluation value being calculated by factoring in the execution of the specific type of image processing by the image processing instruction.

\* \* \* \* \*